United States Patent [19]

Raynor

[11] 4,273,882
[45] Jun. 16, 1981

[54] PREPARATION OF THERMALLY STABLE RIGID POLYURETHANE FOAM

[75] Inventor: Robert J. Raynor, North Branford, Conn.

[73] Assignee: Olin Corporation, New Haven, Conn.

[21] Appl. No.: 155,371

[22] Filed: Jun. 2, 1980

[51] Int. Cl.³ ............................................. C08G 18/14
[52] U.S. Cl. ................................... 521/110; 521/112; 521/167; 521/175
[58] Field of Search ................. 521/110, 112, 175, 167

[56] References Cited

U.S. PATENT DOCUMENTS

| 3,265,641 | 8/1966 | Wismer et al. | 521/175 |
| 3,332,934 | 7/1967 | Booth et al. | 521/175 |
| 3,442,888 | 5/1969 | Degginger et al. | 521/175 |
| 3,509,077 | 4/1970 | Shultz | 521/175 |
| 3,799,896 | 3/1974 | Moss | 252/188.3 |
| 3,903,346 | 9/1975 | DeLeon et al. | 428/313 |
| 3,940,517 | 2/1976 | DeLeon | 427/373 |
| 4,028,158 | 6/1977 | Hipchen et al. | 264/45.5 |

Primary Examiner—Maurice J. Welsh
Attorney, Agent, or Firm—William D. Sabo

[57] ABSTRACT

A process for the preparation of rigid polyurethane foams which are relatively stable at elevated temperatures involves reacting a polyether polyol reactant with an organic polyisocyanate reactant in the presence of a foaming agent comprising water. The polyol reactant is a select combination of three polyols and is effective in improving the thermal stability of the resulting foam without appreciably affecting its other physical properties.

11 Claims, No Drawings

PREPARATION OF THERMALLY STABLE RIGID POLYURETHANE FOAM

This invention relates to an improvement in the production of polyurethane foam, and, more particularly, it relates to an improvement in thermal stability in rigid polyurethane foams.

It is known that the use of water as a foaming agent in the preparation of polyurethane foams promotes the formation of urea linkages, and that such linkages tend to increase the thermal stability of the resulting foam. However, there is a problem in using a relatively high content of water in the foam reaction mixture, in that foams blown entirely with water are generally brittle in character, and they display a high friability value and low compressive strength. Accordingly, there is a need in the art for a process for making rigid polyurethane foams which have improved resistance to degradation at elevated temperatures, yet which at the same time do not exhibit deterioration of other foam properties, such as friability, mechanical strength and dimensional stability.

It is an object of the invention to provide a process for preparing rigid polyurethane foams having a relatively high resistance to degradation at elevated temperatures.

It is another object of the invention to provide a process for preparing rigid polyurethane foams which demonstrate a relatively low friability value and desirable mechanical strength and dimensional stability properties.

It is yet a further object of the invention to provide a process for preparing rigid polyurethane foams which are thermally stable, yet which are also relatively low in cost.

It has now been discovered that these and other objects can be accomplished in making rigid polyurethane foams by using an effective amount of water as a foaming agent in a reaction mixture that comprises an organic polyisocyanate and a polyol reactant which includes a select combination of polyols. These objectives are achieved, according to the invention, by employing as the polyol reactant: a main polyol having a hydroxyl number of about 250-650 and being the product of reacting a mixture of a carbohydrate and a member selected from the group consisting of ethylene diamine, the ethanolamines and a mixture thereof, with an oxide selected from the group consisting of ethylene oxide, propylene oxide, butylene oxide and a mixture thereof; a first supplemental polyol having a hydroxyl number of about 50–250 and having 2–3 hydroxy groups; and a second supplemental polyol having a hydroxyl number of about 300–800 and being comprised of a hydroxy-terminated adduct of alkylene oxide and an amine initiator, in which adduct substantially all the hydroxy groups are primary.

It is an additional feature of the invention that the foams may be blown entirely with water, and the use of freon may be avoided. This is important since freon, a common blowing agent in rigid polyurethane foam production, has been found to have adverse effects on the environment. In practicing the process of the present invention, the problems ordinarily encountered in using a relatively high content of water in the foam reaction mixture—brittleness, highly friability factor and low compressive strength—are overcome. In one form of the invention, however, a small amount of freon may be employed as a component in the reaction mixture to impart an additional insulative effect to the resulting foam.

Another feature of the invention is that the use of catalysts may be avoided resulting in a reduced cost in preparing rigid polyurethane foam products. However, it may be desirable in some instances to employ a catalyst in order to increase the reactivity of the process, and in another embodiment of the invention a catalytic amount of a conventional catalyst is employed.

As described hereinabove, the polyol reactant used in preparing the rigid polyurethane foams herein is comprised of a combination of three polyols; namely, a main polyol, a first supplemental polyol and a second supplemental polyol. More in detail, the main polyol is prepared by reacting a mixture of a carbohydrate and an amine with an alkylene oxide.

A particularly preferred carbohydrate for use in preparing the main polyol is that selected from the group consisting of sucrose, dextrose, sorbitol or a mixture thereof, and the most preferred carbohydrate is sucrose. Exemplificative of the amines that may be employed are ethylene diamine and the ethanolamines, such as mono-, di-, and triethanolamine and mixtures thereof, the most preferred amine being diethanolamine. Any suitable molar ratio of carbohydrate to amine may be used in preparing such mixtures. For example, a molar ratio of about 1 to about 12, and preferably about 1–3 moles of amine may be employed per mole of carbohydrate.

The main polyol may be prepared by methods well known in the art. For example, it can be prepared by condensing, in the presence of an oxyalkylation catalyst, the carbohydrate/amine mixture with the alkylene oxide. In preparing the main polyol, a wide variety of conventional oxyalkylation catalysts may be employed, if desired, to promote the condensation reaction between the carbohydrate/amine mixture and the alkylene oxide. However, it is preferred to use as a catalyst a basic compound such as an alkali metal hydroxide, e.g., potassium hydroxide. Usually carried out at a temperature of about 50° C. to about 160° C., the condensation reaction is allowed to proceed using such proportion of alkylene oxide to carbohydrate/amine mixture so as to obtain a polyol having a hydroxyl number ranging from about 250 to about 650, and preferably about 300–400.

Pursuant to the method of the invention, the rigid polyurethane foam is prepared from a polyol reactant which comprises in addition to the main polyol as described above a first supplemental polyol and a second supplemental polyol. As indicated above, the first supplemental polyol is characterized by a functionability of 2–3, i.e., 2–3 hydroxy groups in the molecule, and a hydroxyl number of about 50–250. In accordance with the conventional method for converting hydroxyl number to molecular weight, this hydroxyl number range corresponds to a molecular weight range of about 2,244–449 in the case of the difunctional polyols and about 3,366–673 in the case of the trifunctional polyols.

As with the main polyol, the first supplemental polyol can be prepared by oxyalkylation techniques well known and conventionally used in the prior art. For example, it can be prepared by condensing, in the presence of an alkaline catalyst, such as potassium hydroxide, an aliphatic diol, triol or mixture thereof with an alkylene oxide having 2–4 carbon atoms or with a mixture of such oxides using random or step-wise oxyalkylation techniques. Illustrative aliphatic diols and triols include ethylene glycol, propylene glycol, the butylene glycols, glycerol, trimethylolpropane, triethylolpropane, mixtures thereof and the like. Illustrative alkylene oxides are ethylene oxide, propylene oxide and butylene oxide.

In accordance with a preferred embodiment of the invention, the first supplemental polyol is prepared using, as the oxyalkylating agent, propylene oxide alone or followed by, i.e., capped with, ethylene oxide. Pursuant to this embodiment, the first supplemental polyol is an oxypropylated or oxypropylated then oxyethylated diol or triol, the triol being most preferred.

In preparing the first supplemental polyol, the oxyalkylation reaction is allowed to proceed using a proportion of reactants to achieve a polyol which has a hydroxyl number ranging from about 50 to about 250, and preferably from about 100 to about 150. This preferred hydroxyl number range corresponds to a preferred molecular weight range of about 1,122–748 in the case of the difunctional polyols and about 1,683–1,122 in the case of the trifunctional polyols.

As indicated above, the second supplemental polyol is comprised of a hydroxy-terminated adduct of alkylene oxide and an amine initiator, in which adduct substantially all the hydroxy groups are primary groups. Such a polyol may be prepared by condensing, in the presence of an oxyalkylation catalyst, an amine initiator with alkylene oxide.

Any suitable amine initiator, including mixtures of initiators containing an amine, may be employed in preparing the second supplemental polyol. Suitable amines include the following and mixtures thereof:

a. The primary aliphatic amines including mono-, di and triamines. These amines usually contain 1–8, and preferably 1–4, carbon atoms such as methylamine, ethylamine, n-propylamine, n-butylamine, n-amylamine, n-hexylamine, ethylene diamine, diaminopropane, diaminobutane, pentamethylene diamine, diethylene triamine, and mixtures thereof. Particularly preferred amines in this group are the diamines having 2–4 carbon atoms such as ethylene diamine.

b. The primary aromatic amines including mono-, di-, and triamines. Preferably these contain 6–8 carbon atoms such as aniline, methylaniline, phenylene diamine, toluene diamine and triaminobenzene. A particularly preferred amine in this group is toluene diamine which may be any isomer, such as 2,3-2,4- and 2,6-toluene diamine, or a mixture of such isomers.

c. The alkanolamines, i.e., the aliphatic hydroxy amines. Usually each alkanol group in these amines contains from 2 to 5 carbon atoms. Illustrative are ethanolamine, diethanolamine, triethanolamine, the mono-, di-, and tripropanolamines, ethanolpropanolamine, and the mono-, di-, and tributanolamines. Particularly preferred alkanolamines are those in which each alkanol group contains 2–3 carbon atoms such as the ethanolamines, the propanolamines and the ethanolpropanolamines.

The most preferred amines referred to above are selected from the group consisting of ethylene diamine, diaminopropane, toluene diamine, an ethanolamine such as mono-, di-, and triethanolamine, a propanolamine such as mono-, di-, and tripropanolamine, an ethanolpropanolamine such as monoethanolmonopropanolamine and diethanolpropanolamine, and mixtures of these amines.

An amine initiator as described above is condensed with alkylene oxide in preparing the second supplemental polyol. Any suitable alkylene oxide, such as ethylene oxide, propylene oxide, butylene oxide, or a mixture of alkylene oxides may be employed provided that the product polyol contains substantially only primary hydroxy groups. However, it is preferred to employ ethylene oxide alone or in combination with a higher alkylene oxide provided the oxyalkylation is carried out step-wise with ethylene oxide being the sole, final oxyalkylating agent. The use of ethylene oxide alone is most preferred, in which case the adduct would be an oxyethylated amine.

A variety of conventional oxyalkylating catalysts may be used in carrying out the amine oxyalkylation reaction. However, it is preferred to employ an alkaline catalyst such as potassium hydroxide. The oxyalkylation reaction is allowed to proceed, using usually elevated temperatures, and employing such amounts of the amine initiator and alkylene oxide to obtain a polyether polyol product which has a hydroxyl number of about 300–800 and preferably about 450–700. The reaction is then terminated and the product is recovered for use as a second supplemental polyol according to the invention.

Any suitable proportions of the first and second supplemental polyols may be employed which are effective in enhancing the thermal stability of the foam without otherwise interfering with, or detrimentally altering, its other properties. Usually, the polyol reactant contains a proportion of the main polyol which ranges from about 30 to about 80 weight percent. The polyol reactant also typically includes an amount of the first supplemental polyol ranging from about 10 to about 35 weight percent, and an amount of the second supplemental polyol also ranging from about 10 to about 35 weight percent. These weight percents are based on 100 parts of the total polyol reactant in the foam-forming reaction system. Preferably, about 40–60, 30–20, and 30–20, weight percent of the main polyol, first supplemental polyol and second supplemental polyol, respectively, are employed in preparing the foams of the invention. The requisite proportions of the first and second supplemental polyols may be preparatorily blended in with the main polyol or they may be added separately to the foam-forming reaction mixture.

In preparing the foams of the invention, the above-described polyols are reacted with an organic polyisocyanate in the presence of a foaming agent. Either the one-shot method or the prepolymer technique may be employed in carrying out the reaction. Any suitable organic polyisocyanate, or mixture of polyisocyanates, may be used which is capable of reacting with a polyether polyol to form a polyurethane. Illustrative are toluene diisocyanate, such as the 80:20 and the 65:35 mixtures of the 2,4:2,6-isomers methylene-bis(4-phenylisocyanate), 3,3'-bitolylene 4,4'-diisocyanate, 3,3'-dimethoxy-4,4'-bitolylene 4,4'-dinaphthalene-1,5-diisocyanate, hexamethylene diisocyanate, polymethylene polyphenylisocyanate, and the like. The preferred isocyanates are toluene diisocyanate, polymethylene polyphenylisocyanate, and mixtures thereof. The polymethylene polyphenylisocyanate usually has a functionability of about 2.0–3.5, preferably about 2.8–3.5, and more preferably about 3.0–3.5; it may be purchased commercially under the trademark "PAPI". The amount of isocyanate employed in the preparation of the polyurethane foams should be sufficient to provide about 1.0 to 4.0, preferably about 1.5–2.5, and more preferably about 1.6–1.7, NCO groups per each hydroxy group, including that provided by the presence of water, in the foam-forming reaction system. A 100 multiple of the ratio of NCO to OH groups in the foam-forming reaction system is referred to as the "index".

The preferred foaming agent employed in preparing the polyurethane foams is water for the main reason that it reacts with the polyisocyanate to form urea structures, the latter having thermal stability superior to urethanes. The amount of water can be varied over a wide range; generally, however, it is employed in an amount ranging from about 2 to about 44, and preferably 6–8, parts by weight per 100 parts of the total polyol reactant. It is preferred to use water alone as the foaming agent; however, other foaming agents known in the art of preparing polyurethane foams can be used in small amounts in addition to the water. Preferred foaming agents useful for this purpose are the halogenated hydrocarbons which include, for example, monofluorotrichloromethane, difluorodichloromethane, the trichlorotrifluoroethanes, dichlorotetrafluoroethane, methylene chloride, and the like. Generally, when the halogenated hydrocarbons are employed, an amount is used ranging from about 7 to about 34, and preferably 15–25, parts by weight per 100 parts of the total polyol reactant in the foam-forming reaction system. It has been found that the addition to the reaction mixture of a small amount of a halogenated hydrocarbon within the foregoing range may be desired under some circumstances to improve the insulation quality of the foam without significantly altering the other foam properties.

It is an advantage of the invention that the use of catalysts may be avoided in preparing the polyurethane foams of the invention. However, if it is desired to increase the rate of reaction, any of the catalysts, or mixtures thereof, which are known in the art to catalyze the polyurethane foam-forming reaction may be employed. These include the tertiary amines, such as N-methylmorpholine and triethylenediamine, and the organic metal salts such as stannous octoate and dibutyltin dilaurate. Generally, the catalyst may be employed in any suitable catalytic proportion such as from about 0.05 to about 3.0, and preferably from about 0.075 to about 2.0, percent by weight based on the total weight of the polyol reactant in the reaction system.

It is preferred in the preparation of the polyurethane foams of the invention to employ minor amounts of a conventional polyurethane foam surfactant. Typical of these are the silicon-based surfactants such as the silicone oils and soaps and the siloxanes. Usually, the amount of surfactant ranges up to about 3 parts by weight per 100 parts of the total polyol reactant in the reaction system.

Various additives may also be incorporated in the polyurethane foam-forming reaction mixture, if desired, such as fillers, dyes, plasticizers, deodorants and antioxidants.

The improved process of the invention provides a relatively simple and practically attractive route to resolving the problem of thermal degradation in rigid polyurethane foam. Furthermore, this primary objective is achieved at minimum cost and without undermining or altering the other basic properties of the foam.

The polyurethane foams of the invention are of utility in a variety of commercial and industrial applications including for example as insulation in houses and other buildings, and like applications. They are also of utility as insulation in solar collectors and in aircraft and space vehicles; another use is as pipe insulation.

The following example is provided to illustrate the invention.

EXAMPLE 1

A rigid polyurethane foam was prepared from a reaction mixture consisting of the following ingredients, in the indicated proportions:

| Ingredients | Parts by Weight |
| --- | --- |
| Main Polyol[1] | 45.39 |
| First supplemental polyol[2] | 22.70 |
| Second supplemental polyol[3] | 22.70 |
| Water | 6.49 |
| Dow Corning 193 surfactant[4] | 2.72 |
| Polymethylene polyphenylisocyanate[5] | (164 index)[6] |

[1] This is a 357 hydroxyl number polyether polyol prepared by reacting, in the presence of potassium hydroxide catalyst, propylene oxide with a mixture of sucrose and diethanolamine in a molar ratio of 2.25 moles of diethanolamine per mole of sucrose.
[2] This is oxyalkylated glycerol, hydroxyl number 120, prepared by the sequential oxyalkylation of glycerol, first with propylene oxide and then with ethylene oxide.
[3] This is oxyethylated diethanolamine, hydroxyl number 600.
[4] This is a silicone-glycol copolymer described in an August, 1968 Dow Corning bulletin No. 05-146.
[5] This is a commercial product of the Upjohn Company purchased under the trademark "PAPI-20" and having an approximate functionability of 3.1.
[6] The proportion of isocyanate was calculated to provide in the example an index of 164.

The ingredients were mixed together and foamed in a metal mold (16"×16"×2"), the mold having been preheated to a temperature of about 100° F. The resulting foam had a cream time of 20 seconds, a tack-free time of 90 seconds, and a free-rise density of 1.7 p.c.f. After being cured, the foam panel was tested. The tests showed that the foam had excellent resistance to thermal degradation. The foam also exhibited a low friability value, and it displayed superior dimensional stability. The results of the physical property testing are tabulated in Table I below.

TABLE I

| Property | Test Method | Result |
| --- | --- | --- |
| Density, p.c.f. | | |
| Overall | ASTM-D-1622-63 | 2.33 |
| Core | ASTM-D-1622-63 | 2.06 |
| Compressive Strength, p.s.i. | | |
| Parallel to Rise | ASTM-D-1621-73, Procedure A | 26 |
| Perpendicular to Rise | ASTM-D-1621-73, Procedure A | 21 |
| Porosity, % closed cells | ASTM-D-2856-70 | 70 |
| "K" Factor, initial | ASTM-C-518-76 | 0.19 |
| Friability, % weight loss, 10 min. | ASTM-C-421-71 | 4 |
| Cold Age Test, −20° F., % change in volume, 7 days | ASTM-D-2126-75 | 0 |
| Heat Age Test, 257° F., % change in volume, 28 days | ASTM-D-2126-75 | −2 |
| Humid Age Test, 158° F. and 100% relative humidity, % change in volume, 28 days | ASTM-D-2126-75 | 1 |
| Thermal Gravimetric Analysis, 500° F., % weight loss, 2 hours | * | 24.5 |

*This test was performed using a DuPont 951 Thermogravimetric Analyzer to measure the weight change of the foam at a constant temperature of 500° F. over a period of 2 hours.

What is claimed is:

1. A process for preparing a rigid polyurethane foam which comprises reacting a polyether polyol reactant with an organic polyisocyanate reactant in the presence of a foaming agent having a proportion of water ranging from about 2 to about 44 parts by weight per 100 parts of the total polyol reactant, said proportion being effective in promoting the formation of urea structures to enhance the thermal stability of said foam, said polyether polyol reactant including:

a main polyol having a hydroxyl number of about 250–650 and being the product of reacting a mixture of a carbohydrate and a member selected from the group consisting of ethylene diamine, the ethanolamines and a mixture thereof, with an oxide selected from the group consisting of ethylene oxide, propylene oxide, butylene oxide and a mixture thereof, said member being employed in a molar ratio ranging from about 1 to about 12 moles per mole of said carbohydrate;

a first supplemental polyol having a hydroxyl number of about 50–250 and being the product of reacting an aliphatic diol, triol or a mixture thereof with an alkylene oxide having 2–4 carbon atoms; and a second supplemental polyol having a hydroxyl number of about 300–800 and being an adduct of ethylene oxide and an amine selected from the group consisting of an aliphatic amine having 1–8 carbon atoms, an aromatic primary amine having 6–8 carbon atoms, an alkanolamine in which each alkanol group contains 2–5 carbon atoms, and a mixture thereof; and wherein:

said main polyol is employed in a proportion of from about 30 to about 80 percent, said first supplemental polyol is employed in a proportion of from about 35 to about 10 percent, and said second supplemental polyol is employed in a proportion of from about 35 to about 10 percent, all percentages being based upon the total weight of said polyol reactant; and said polyisocyanate reactant is used in an amount so as to provide about 1.0 to about 4.0 NCO groups per hydroxy group in the reaction system.

2. A polyurethane foam prepared according to the process as recited in claim 1.

3. The process as recited in claim 1, wherein: said first supplemental polyol has a hydroxyl number of about 100–150, and is an oxypropylated or oxypropylated then oxyethylated diol or triol; and said second supplemental polyol has a hydroxyl number of about 450–700, and wherein said aliphatic amine is a diamine having 2–4 carbon atoms, said aromatic amine is toluene diamine, and said alkanolamine is an ethanolamine, a propanolamine or an ethanolpropanolamine.

4. The process as recited in claim 1, wherein said foaming agent consists essentially of water.

5. A polyurethane foam prepared according to the process as recited in claim 4.

6. The process as recited in claim 4, wherein said foaming agent is employed in a proportion of about 6–8 parts per every 100 parts by weight of said polyether polyol reactant.

7. The process as recited in claim 6, wherein said polyether polyol reactant includes: from about 40 to about 60 weight percent of said main polyol, from about 30 to about 20 weight percent of said first supplemental polyol, and from about 30 to about 20 weight percent of said second supplemental polyol.

8. The process as recited in claim 7, wherein: said main polyol is the product of reacting propylene oxide with a mixture of sucrose and diethanolamine;

said first supplemental polyol is prepared by the sequential oxyalkylation of glycerol, first with propylene oxide and then with ethylene oxide; and said second supplemental polyol is an adduct of ethylene oxide and an ethanolamine.

9. The process as recited in claim 8, wherein said reaction mixture comprises a silicon-based surfactant.

10. The process as recited in claim 9, wherein said organic polyisocyanate reactant is toluene diisocyanate, polymethylene polyphenylisocyanate, or a mixture thereof.

11. A polyurethane foam prepared according to the process as recited in claim 10.

* * * * *